(12) United States Patent
Kouta

(10) Patent No.: US 6,172,800 B1
(45) Date of Patent: Jan. 9, 2001

(54) LASER WAVELENGTH CONVERSION METHOD AND DEVICE

(75) Inventor: Hikaru Kouta, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/109,733

(22) Filed: Jul. 2, 1998

(30) Foreign Application Priority Data

Jul. 16, 1997 (JP) ................................................ 9-191191

(51) Int. Cl.[7] ........................................................ G02F 1/37
(52) U.S. Cl. .................................................................. 359/328
(58) Field of Search .................... 359/326–332; 372/21, 22

(56) References Cited

U.S. PATENT DOCUMENTS

| | | | |
|---|---|---|---|
| 4,884,277 | * | 11/1989 | Anthon et al. .......................... 372/22 |
| 5,047,668 | * | 9/1991 | Bosenberg ............................ 359/330 |
| 5,079,445 | * | 1/1992 | Guyer .................................... 359/330 |
| 5,117,126 | * | 5/1992 | Geiger ................................... 359/330 |
| 5,249,190 | * | 9/1993 | Kortz et al. .............................. 372/22 |
| 5,315,433 | * | 5/1994 | Okazaki et al. ...................... 359/328 |
| 5,477,378 | * | 12/1995 | Johnson ................................ 359/326 |
| 5,768,302 | * | 6/1998 | Wallace et al. ......................... 372/21 |

FOREIGN PATENT DOCUMENTS

| | | |
|---|---|---|
| 2-202079 | 8/1990 | (JP) . |
| 4-15975 | 1/1992 | (JP) . |
| 4-157429 | 5/1992 | (JP) . |
| 5-5919 | 1/1993 | (JP) . |
| 6-120586 | 4/1994 | (JP) . |
| 6-265955 | 9/1994 | (JP) . |
| 7-211976 | 8/1995 | (JP) . |
| 7-311396 | 11/1995 | (JP) . |

OTHER PUBLICATIONS

Japanese Search Report dated Nov. 30, 1999 with Partial Translation.

* cited by examiner

*Primary Examiner*—John D. Lee
(74) *Attorney, Agent, or Firm*—McGinn & Gibb, PLLC

(57) ABSTRACT

A laser wavelength conversion method and device for making the converted beam shape and the energy distribution point symmetrical which is suitable for high precision manufacturing and machining. First and second wavelength conversion devices are adjusted such that the phase matching orientations which give the minimum angular tolerances are orthogonal with each other. Fundamental wave is focused by focusing lens, and then incident on first device and second device, and is ejected as the cross shaped beam made of two orthogonal ellipses of the second harmonic waves. First device and second device are unified in order to eliminate the angular adjustment thereof for improving the working efficiency.

23 Claims, 6 Drawing Sheets

17: 2ω WAVE OBTAINED BY SECOND DEVICE

16: 2ω WAVE OBTAINED BY FIRST DEVICE

22: FIRST DEVICE PAIR
23: SECOND DEVICE PAIR
25: WAVELENGTH CONVERSION DEVICE

26: SECOND HARMONIC GENERATOR
27: FOURTH HARMONIC GENERATOR
2: FOCUSING LENS
28: ELLIPTIC 2ω BEAM WHICH IS LONG IN LONGITUDINAL DIRECTION
29: CORRECTED 4ω BEAM WHICH IS ALMOST CIRCULAR

LASER WAVELENGTH CONVERSION METHOD AND DEVICE

BACKGROUND OF THE INVENTION

1. Field of the Invention

The present invention relates to a laser wavelength conversion method and device for making the shape and energy distribution of converted laser beam point symmetrical, which is necessary in the application of laser beam, such as a semiconductor process and a micro scale manufacturing.

2. Description of the Prior Art

In the wavelength conversion of laser by using a wavelength conversion device which utilizes angular phase matching, the shape of the higher harmonic beam becomes elliptic, because the tolerance of the phase matching angle is anisotropic. Further, it is necessary to increase the power density by focusing the fundamental wave through a lens, thereby improving the conversion efficiency. In this case, the ellipticity of the converted harmonic wave 44 becomes greater as shown in FIG. 10. Therefore, a cylindrical lens is used to compensate the beam shape. However, the cylindrical lens can not make the beam shape and the energy distribution perfectly point symmetrical. When the forth harmonic wave is generated by using a lens with a shorter focal length, thereby increasing the power density of the second harmonic wave, it becomes difficult to obtain a circular shaped beam, even if the cylindrical lens is used for compensating the beam shape, because the ellipticity of the forth harmonic wave becomes far greater.

It is preferable that the beam shape and energy distribution of the laser beam of which wavelength is converted is point symmetrical for the application to micro manufacturing. However, in the conventional wavelength conversion method, the shape of the converted laser beam becomes elliptic. Particularly, the beam is greatly deformed, if it is focused by the short focus lens. This causes problems in a high accuracy manufacturing, because the elliptic beam results in an elliptic shape in the exposed position. Further, the result of correction by the cylindrical lens is far from the point-symmetry.

SUMMARY OF THE INVENTION

Therefore, an object of the present invention is to provide a wavelength conversion method and device which converts the laser wavelength without forming the laser beam far from the point-symmetry.

In accordance with the present invention, there is provided a first mode of the laser wavelength conversion method for converting wavelength of the fundamental wave of laser light which is incident on a wavelength conversion device through a focusing lens, wherein two wavelength conversion devices are used in such an arrangement that the directions which give the minimum angular tolerance of the phase matching for the wavelength conversion devices are set to be orthogonal with each other. The fundamental wave is incident in succession on the above-mentioned two wavelength conversion devices in order to obtain harmonic wave output.

The first mode of the conversion method may include a step of adjusting the length of each wavelength conversion device in order to equalize the output from each device within an accuracy of 80 to 100%.

The first mode of the conversion method also may include a step of controlling the energy density of the fundamental wave in each conversion device in order to equalize the output from each device within an accuracy of 80 to 100%.

The first mode of the conversion method further may include a step of controlling the energy density of the fundamental wave in each conversion device by changing the distance between the focusing lens and the surface of each conversion device.

The first laser mode of the wavelength conversion method of the present invention further may include a step of rotating the phase matching axis of each wavelength conversion device by 180° with each other.

The first mode of the laser wavelength conversion device of the present invention is a united structure of the first wavelength conversion device and the second wavelength conversion device.

The above-mentioned first mode of the laser wavelength conversion device of the present invention is constructed by integrating the two wavelength conversion devices by one of such bonding methods as optical contact, fusion, adhesion, or molding.

A second mode of the conversion method of the present invention for laser wavelength conversion is a method of obtaining the forth harmonic wave, which comprises the steps of obtaining an elliptic second harmonic beam by allowing the fundamental wave to enter into the second harmonic generator after focusing the fundamental wave by a focusing lens, and obtaining the forth harmonic wave by allowing the second harmonic wave to enter into the forth harmonic generator, so that the apse axis of the elliptic second harmonic beam is arranged along the direction which gives the minimum phase matching angular tolerance.

The above-mentioned second mode of conversion method includes the step of converting the laser wavelength by using a united structure of the second harmonic generator and the forth harmonic generator.

The second mode of laser wave conversion device of the present invention is the united structure of the second harmonic generator and the forth harmonic generator which is used in the above-mentioned second conversion method.

The above-mentioned second mode of laser wavelength conversion device of the present invention is constructed by integrating the two wavelength conversion devices by one of such bonding methods as optical contact, fusion, adhesion, or molding.

As explained above, the laser wavelength is converted by using the two wavelength conversion devices, taking into consideration the phase matching orientations. When the conversion device with the great anisotropy of the phase matching angular tolerance is utilized, the beam pattern and energy distribution of the converted beam can be made almost point-symmetrical, even when the beam shape can not be compensated by the cylindrical lens. Thus, the obtained point-symmetrical beam is effectively applicable to, for example, a semiconductor device process and a micro machining. Further, the unified structure of the two wavelength conversion devices improves the working efficiency, because it is treated as a single device which is not needed to be adjusted in the angular arrangement.

Further, in the present invention, the shape of the second harmonic beam is made elliptic by using the second harmonic generator (SHG) with the great anisotropy of the phase matching angular tolerance, and the apse axis of the obtained elliptic beam is allowed to coincide with the orientation which gives the minimum phase matching angular tolerance in the fourth harmonic generator (FHG). Thus, an approximately circular fourth harmonic beam can be obtained, which could not be obtained by, for example, the cylindrical lens. Therefore, the working efficiency is also improved by the unified structure of the SHG and the FHG.

DESCRIPTION OF THE PREFERRED EMBODIMENT

Figure 1:
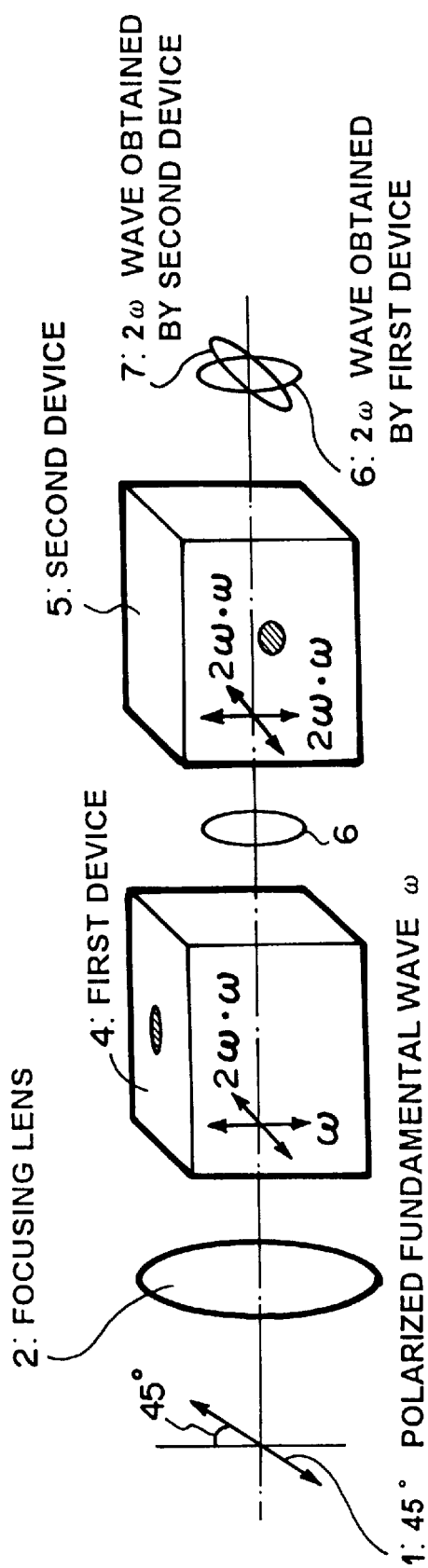
FIG. 1 is a perspective illustration of the first mode of the laser wavelength conversion method of the present invention.

Referring to the drawings, the modes of the present invention are explained in detail.

In the first mode of the laser wavelength conversion method of the present invention as shown in FIG. 1, the orientations which give the minimum tolerances of the phase matching angles of first wavelength conversion device (the first device) 4 and that of second wavelength conversion device (second device) 5 are adjusted to be orthogonal. Fundamental wave 1 is focused by focusing lens 2, then incident on first device 4 and on second device, and exits as the harmonic wave. Here, first device 4 and second device 5 are fabricated considering the phase match orientation which gives the desired harmonic wave.

In general, the angular dispersion of the refractive index is utilized in order to equate the refractive index of the fundamental wave with that of the harmonic wave, in case of the wavelength conversion by using the angular phase matching.

Figure 2:
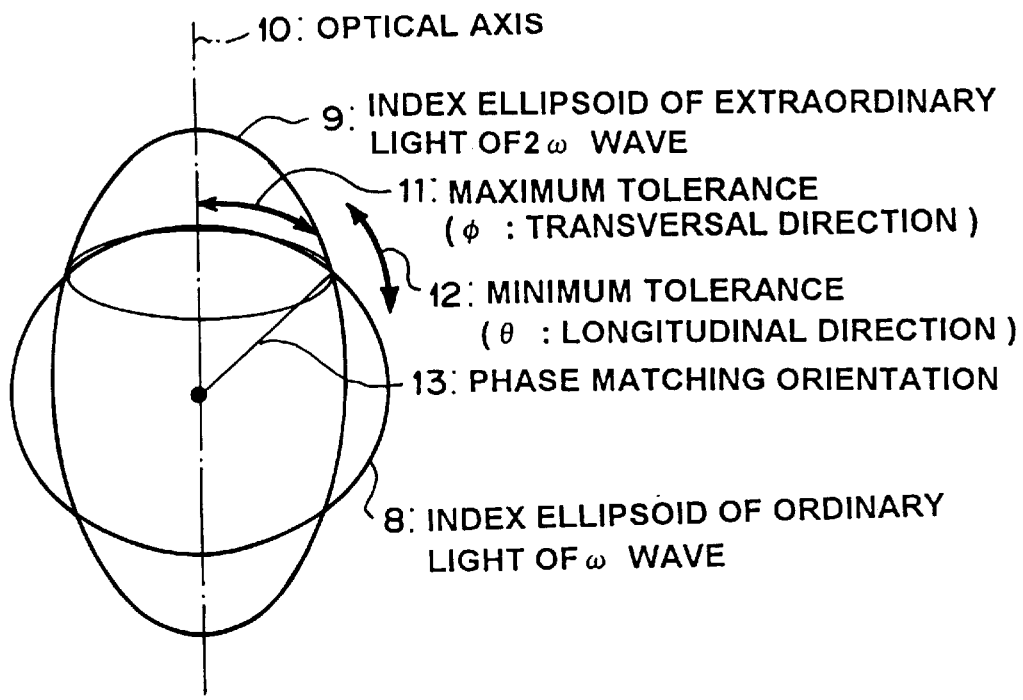
FIG. 2 is an illustration for explaining the anisotropy of the phase matching angular tolerance of the wavelength conversion device.
Figure 10:
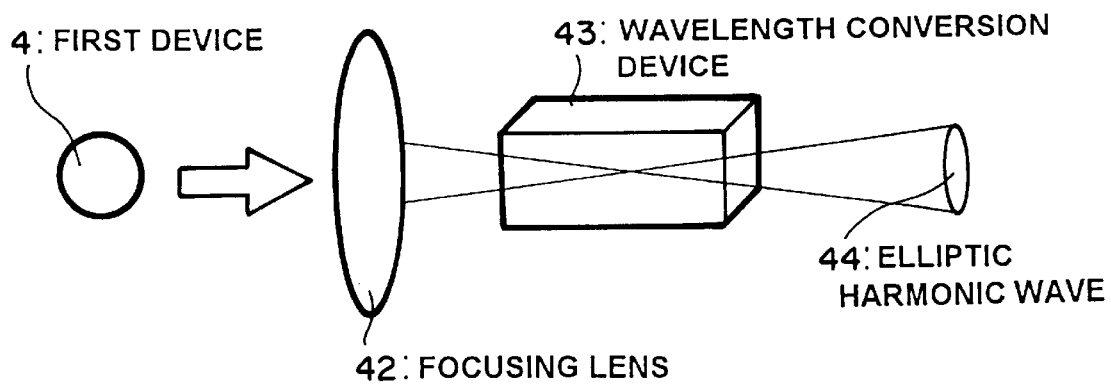
FIG. 10 is a perspective illustration of an example of the conventional laser wavelength conversion method.
Figure 11:
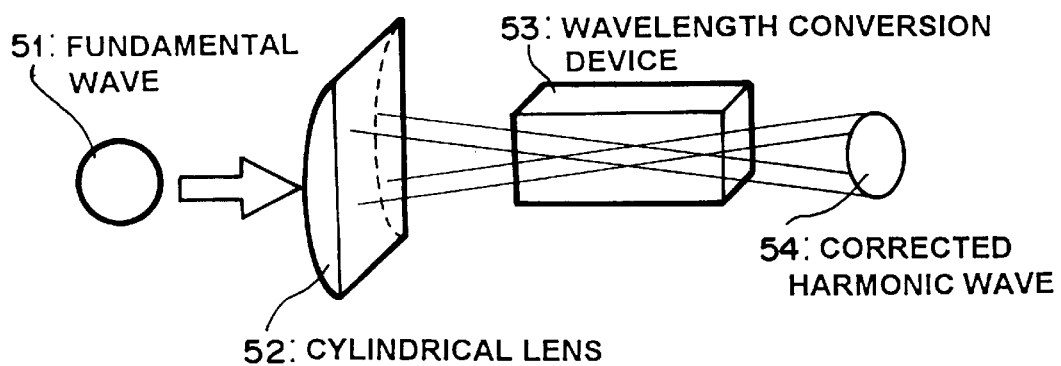
FIG. 11 is a perspective illustration of another example of the conventional laser wavelength conversion method.

As shown in FIG. 2, tolerances 11 and 12 of the phase matching orientation 13 is small in the longitudinal direction and great in the transversal direction. Accordingly, as shown in FIG. 10, the converted harmonic beam becomes inevitably elliptic, because the incident laser beam has the convergent and divergent angle. The greater the angular dispersion of the refractive index is, the greater are the anisotropy of the angular tolerance and the ellipticity of the converted beam.

The phase matching method focuses the fundamental wave ω of the ordinary light, converts it into a harmonic wave 2ω of the extraordinary wave, by using such a wavelength conversion device that the phase matching tolerance is great for the polarized direction of ordinary light and is small for the polarized direction of extraordinary light. In FIG. 1, the polarization direction of the ordinary light is indicated as the 0° direction (longitudinal direction). In this case, if the 45° polarized fundamental wave ω is incident on first device 4, the ejected harmonic wave 2ω is 90° polarized and the ejected fundamental wave ω has the 0° component and the 90° component. The ejected 2ω beam 6 is an ellipse with its apse axis in 0° direction. Then, if these components are incident on second device of which phase matching axis is orthogonal with that of first device 4, the 90° polarized ω component is converted to 0° polarized 2ω wave, while the 90° polarized 2ω component passes through the crystal of second device 5, without being converted. The 2ω wave which is generated in second device 5 becomes an ellipse with its apse axis along the 90° direction (transverse direction). Therefore, the cross shaped pattern is formed by the two ellipses 6 and 7 with the apse axes orthogonal with each other, as shown in FIG. 1. In case of the phase matching method wherein fundamental wave ω of the extraordinary light is converted into harmonic wave 2ω of the ordinary light by first device 4, the similar result is obtained as explained above.

Figure 3:
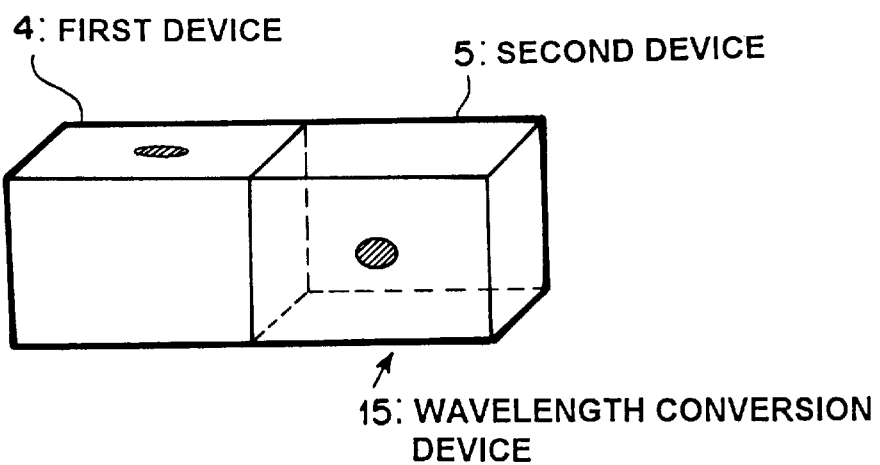
FIG. 3 is a perspective illustration of the first mode of the laser wavelength conversion device of the present invention.

FIG. 3 is a perspective illustration of the first mode of the laser wavelength conversion device of the present invention.

Wavelength conversion device 15 as shown in FIG. 3 is a unified structure of first device 4 and second device 5 as shown in FIG. 1. In the conversion method as shown in FIG. 1, the laser wavelength is converted by using this unified structure.

The above-mentioned unified structure is treated as single device, because the angular adjustment between first device 4 and second device 5 is not necessary. There are several method for making the unified structure, such as an optical contact method by polishing the surface of the devices to the high accuracy of a level of λ/8 or more, a heat pressing method after polishing and contacting them, an adhesion method by an optical bond, or a molding method with an air gap.

Figure 4:
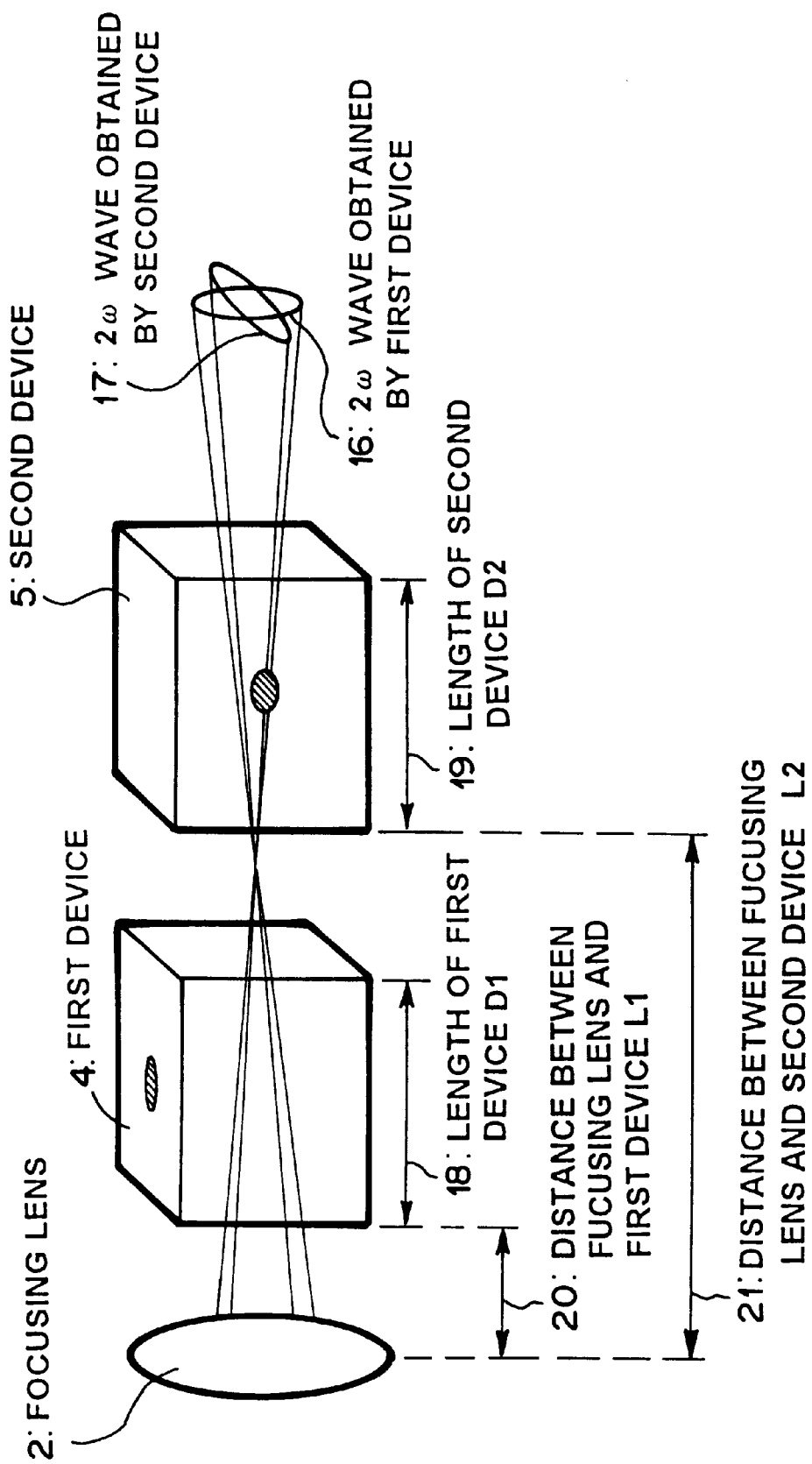
FIG. 4 is a perspective illustration of the second mode of the laser wavelength conversion method of the present invention.

The second method as shown in FIG. 4 is the same as the first method shown in FIG. 1, in the point that the fundamental wave is focused by focusing lens 2, and then incident on first device 4 and on second device 5, and is ejected as the harmonic wave. However, in the second method, the conversion efficiency of harmonic wave in each device can be varied by the lengths of first device D1 18 and D2 19, whereby the energy distribution of the cross shaped pattern by the 2ω harmonic waves can be made point-symmetrical. The same result is obtained by varying the distance between focusing lens 2 and the incident surface of the conversion devices L1 20 and L2 21.

In this second mode of the conversion method, the unified structure 15 of first device 4 and second device 5 as shown in FIG. 3 can be utilized.

Figure 5:
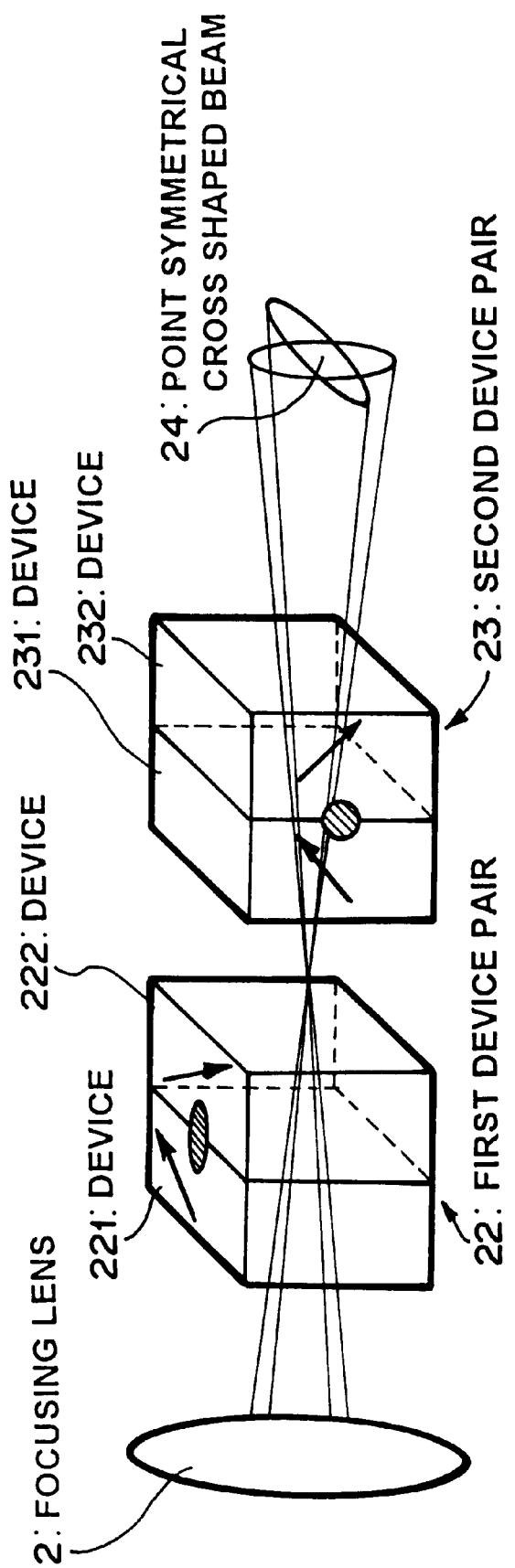
FIG. 5 is a perspective illustration of the third mode of the laser wavelength conversion method of the present invention.

In the third conversion method as shown in FIG. 5, the fundamental wave is incident on first device 22 and second device 23 and is ejected as the harmonic wave, wherein the walk off angles of first device 22 and second device 23 are compensated. First device 22 comprises device 221 and device 222, wherein the phase matching orientations of device 221 and device 222 are 180° rotated with each other. Likewise, second device 23 comprises device 231 and device 232, wherein the phase matching orientations of device 231 and device 232 are 180° rotated with each other. Therefore, the walk off angles of the laser beam in first device 22 and second device 23 are compensated.

Figure 6:
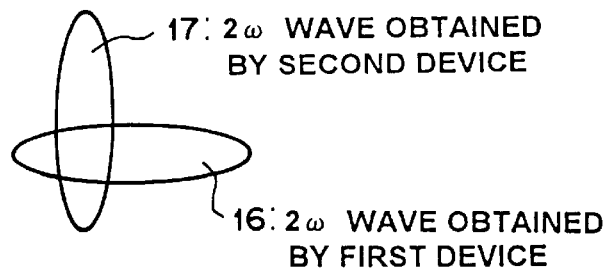
FIG. 6 is an illustration for explaining the cross shaped beam formed by the off centered harmonic beams, because of the walk off in the laser wavelength conversion method as shown in FIG. 3.

In the wavelength conversion method as shown in FIG. 4, if the walk off angle of second device 5 is great, the ω fundamental wave is separated from the harmonic wave in the crystal of second device 5 after passing through first device 4. Therefore, the optical axis of the 2ω harmonic wave generated by first device 4 is displaced from that of the 2ω harmonic wave generated by second device 5 as shown in FIG. 6. A wavelength conversion method for eliminating the above-mentioned displacement is disclosed in Japanese Patent laid-open No. Sho 42-12476 (1977). Referring to this document, the cross shaped pattern 24 by the two 2 ω harmonic waves is made perfectly point-symmetrical by eliminating the above-mentioned displacement by using first device pair 22 and second device pair 23, of which crystal axes are 180° rotated with each other for compensating the walk off angles.

Figure 7:
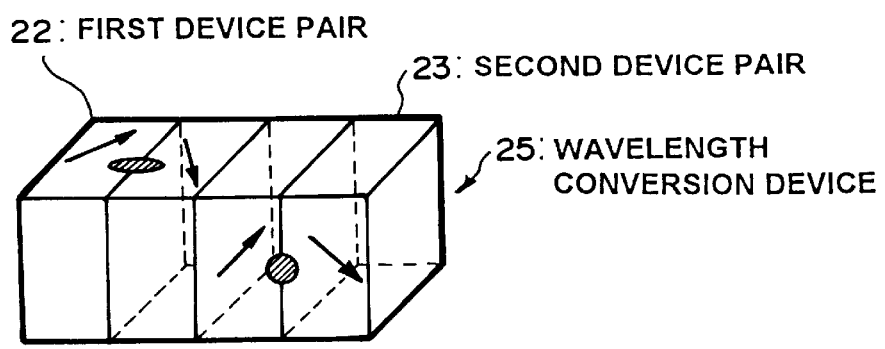
FIG. 7 is a perspective illustration of the second mode of the laser wavelength conversion device of the present invention.

Wavelength conversion device 25 as shown in FIG. 7 is a unified structure of first device pair 22 and second device pair 23 as shown in FIG. 5. In the laser wavelength conversion method as shown in FIG. 5, this mode of the conversion device can be utilized for wavelength conversion.

This mode of the conversion device is not required to adjust the angular arrangement of first device pair 22 and second device pair 23, and is treated as a single device. There are several method for making the unified structure, such as an optical contact method by polishing the surface of the devices to the high accuracy of a level of λ/8 or more, a heat pressing method after polishing and contacting them, an adhesion method by an optical bond, or a molding method with an air gap.

Figure 8:
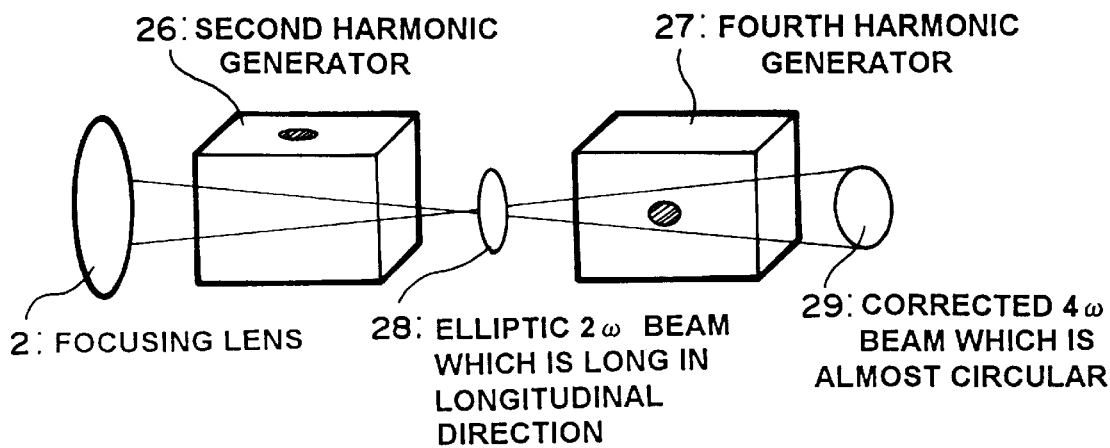
FIG. 8 is a perspective illustration of the fourth mode of the laser wavelength conversion method of the present invention.

As shown in FIG. 8, the fourth mode of the laser wavelength conversion method is a method for generating the fourth harmonic wave by using a wavelength conversion device with the great anisotropy in the phase matching angular tolerance, wherein the fundamental wave ω is focused by focusing lens 2 and then incident on second harmonic generator 26 with anisotropic angular tolerance for intentionally obtaining an elliptic beam pattern 28 of the harmonic wave 2 ω. If the apse axis of this elliptic beam is adjusted to the orientation of fourth harmonic generator 27 which gives the minimum angular tolerance, the beam shape of the harmonic wave 4 ω becomes nearly circular. Further, by varying the focal length of the focusing lens, the beam shape of the harmonic wave 4 ω can approaches a perfect circle.

Figure 9:
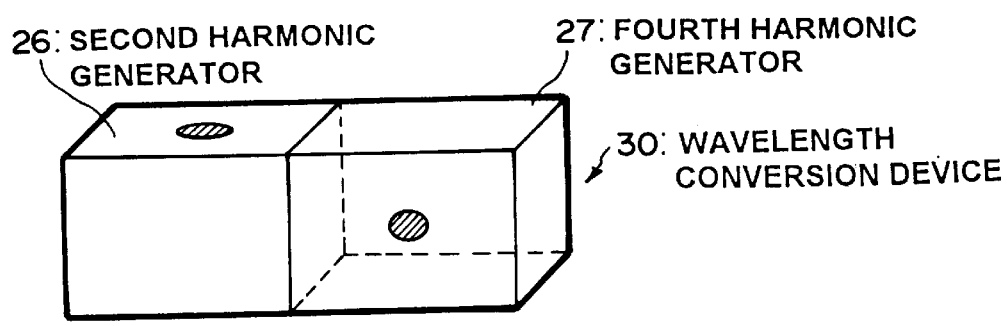
FIG. 9 is a perspective illustration of the third mode of the laser wavelength conversion device of the present invention.

In FIG. 9, wavelength conversion device 30 is an unified structure of second harmonic generator 26 and fourth harmonic generator 27 as shown in FIG. 8. In the laser wavelength conversion method as shown in FIG. 8, this mode of the conversion device can be utilized for wavelength conversion.

An approximately circular beam pattern of the fourth harmonic wave can be obtained from the fundamental wave by using this unified structure. There are several method for making the unified structure, such as an optical contact method by polishing the surface of the devices to the high accuracy of an order of λ/8 or more, a heat pressing method after polishing and contacting them, an adhesion method by an optical bond, or a molding method with an air gap.

Next, working examples of the present invention are explained.

EXAMPLE 1

By using beta Barium Boride (β-BaB$_2$O$_3$:BBO) of which anisotropy of the phase matching angular tolerance is great, the fundamental wave ω of wavelength 1064 nm from Nd:YAG laser was converted into the second harmonic wave 2 ω (532 nm) by the Second Harmonic Generator (SHG). The phase matching angle is about 23°. Two 4 mm long crystals with the 4 mm×4 mm entrance aperture which are cut along the phase matching orientation were prepared. The tolerance θ was 0.03° for the transverse polarization (extraordinary light) and the tolerance φ was 5° for the longitudinal polarization (ordinary light). The focal length f of focusing lens 2 as shown in FIG. 1 was 200 mm. When a 45° polarized (45° from the longitudinal direction) beam of about 1 mm diameter was incident on the conversion device which comprises focusing lens 2, first device 4 (BBO), and second device 5 (BBO), a cross shaped beam by the orthogonal 2 ω harmonic waves with major axis:minor axis ratio 5:1 was obtained.

EXAMPLE 2

Although the cross shaped pattern by the 2 ω harmonic waves was near to the point-symmetry, the energy distribution was not point-symmetrical because of the difference of output power of the harmonic waves from first device 4 and second device 5. Therefore, the distance D1 between focusing lens 2 and first device 4 and the distance D2 between focusing lens 2 and second device 5 are varied by observing the beam intensity distribution by a beam profiler. As a result, the energy distribution of the cross shaped beam became point-symmetrical, when L1 was 185 mm and L2 was 195 mm.

EXAMPLE 3

By using BBO of which anisotropy of the phase matching angular tolerance is great, the 2ω wave ( wavelength 532 nm) obtained by the internal resonance SHG of Nd:YAG laser which emits the ω wave (wavelength 1064 nm) was converted into the 4ω wave (wavelength 266 nm). The phase match angle is 47.6°. Two 2 mm long crystals with the 4 mm×4 mm entrance aperture which are cut along the phase matching orientation were prepared. The tolerance θ was 0.01° for the transverse polarization (extraordinary light) and the tolerance φ was 5° for the longitudinal polarization (ordinary light). The focal length f of focusing lens 2 as shown in FIG. 1 was 100 mm. When a 45° polarized (45° from the longitudinal direction) beam of about 1 mm diameter was incident on the conversion device which comprises focusing lens 2, first device 4 (BBO), and second device 5 (BBO), a cross shaped beam by the orthogonal 4ω harmonic waves with major axis:minor axis ratio 7:1 was obtained.

REFERENCE EXAMPLE

The two 4 mm long BBO were used as the Fourth harmonic Generator (FHG). The other conditions were the same as in the Example 3. In this case, the walk off angles were 4° for the 2ω wave and the 4ω wave. Because of this, the 2ω wave and the 4ω wave proceed to different directions and the centers of the 4ω waves shifted about 1 mm.

EXAMPLE 4

In order to eliminate the shift of the centers of the 4 ω waves in the cross shaped pattern explained in the Reference Example, 8 mm long device pairs 22 and 23 were prepared. Each pair was an unified structure of 4 mm long devices bonded by the optical contact, where the phase matching axes were 180° rotated with each other for compensating the walk off as shown in FIG. 5. Then, the phase matching axis of second device pair 23 was 90° rotated from that of first device pair 22. By using this arrangement, the obtained centers of the 4ω beams were made superposed and the obtained cross shaped pattern was point symmetrical.

EXAMPLE 5

Further, in the Example 4, the exit surface of first device pair 22 and the incident surface of second device pair 23 were polished at λ/10 and were unified by the optical contact. The distance between focusing lens 2 and the incident surface of device 221 was set to be 90 mm. Thus, the energy distribution of the obtained cross shaped beam was made point-symmetrical.

EXAMPLE 6

The 2ω wave (wavelength 532 nm) of the ω wave (wavelength 1064 nm of the Nd:YAG laser) was obtained by the SHG which was made of the BBO that has a great anisotropy of the angular tolerance. An SHG beam with 8:1 ellipticity was obtained, when the longitudinally polarized beam of the fundamental wave ω of about 1 mm diameter was focused by focusing lens 2 with 50 mm focal length and was incident on the SHG which was made of the BBO. The obtained 2ω SHG beam was long in the longitudinal direction and was polarized in the transverse direction. Then the obtained polarized SHG beam was incident on the FHG as an ordinary light and ejected as an FHG beam with 1.1:1 ellipticity which is fairy small, because the apse axis of the ellipse was adjusted to coincide with the BBO orientation which gives the minimum angular tolerance as shown in FIG. 8.

EXAMPLE 7

Further, in the Example 4, the exit surface of the SHG and the incident surface of the FHG were polished at λ/8 and were stuck at 900° C. for 100 hours and unified as shown in FIG. 9. The ellipticity of the obtained FHG beam was 1.1:1. The beam shape was almost the same as in the Example 6.

What is claimed is:

1. A laser wavelength conversion method for converting a fundamental wave of ordinary light into a harmonic wave of extraordinary light by allowing said fundamental wave of a laser to enter into a wavelength conversion device through a focusing lens, wherein said wavelength conversion device comprises two wavelength conversion devices which are cut along an angular phase matching direction with minimum tolerances for obtaining the harmonic wave, said two wavelength conversion devices oriented such that respective phase matching directions are shifted 90° relative to each other, said fundamental wave is allowed to enter into said two wavelength conversion devices, and said harmonic wave is allowed to exit from said wavelength conversion device.

2. The laser wavelength conversion method according to claim 1, wherein the lengths of said two wavelength conversion devices are varied in order to equalize the outputs of said harmonic wave from said two wavelength conversion devices within a level of 80 to 100%.

3. The laser wavelength conversion method according to claim 2, wherein each of said two wavelength conversion devices comprises two wavelength conversion devices which are 180° rotated with each other around said respective angular phase matching direction.

4. The laser wavelength conversion method according to claim 1, wherein the energy densities in said two wavelength conversion devices are controlled in order to equalize the outputs of said harmonic wave from said two wavelength conversion devices within an order of 80 to 100%.

5. The laser wavelength conversion method according to claim 4, wherein the distances between said focusing lens and said two wavelength conversion devices are varied in order to control said energy densities.

6. The laser wavelength conversion method according to claim 5, wherein each of said two wavelength conversion devices comprises two wavelength conversion devices which are 180° rotated with each other around said respective angular phase matching direction.

7. The laser wavelength conversion method according to claim 4, wherein each of said two wavelength conversion devices comprises two wavelength conversion devices which are 180° rotated with each other around said respective angular phase matching direction.

8. The laser wavelength conversion method according to claim 1, wherein each of said two wavelength conversion devices comprises two wavelength conversion devices which are 180° rotated with each other around said respective angular phase matching direction.

9. A laser wavelength conversion device for converting a fundamental wave of ordinary light into a harmonic wave of extraordinary light by allowing said fundamental wave of a laser to enter into a wavelength conversion device through a focusing lens, wherein said wavelength conversion device comprises a unified structure of two wavelength conversion devices which are cut along an angular phase matching direction with minimum tolerance for obtaining the harmonic wave, said two wavelength conversion devices oriented such that respective angular phase matching directions are shifted 90° relative with each other, said fundamental wave is allowed to enter into said two wavelength conversion devices, and said harmonic wave is allowed to exit from said wavelength conversion device.

10. The laser wavelength conversion device according to claim 9, wherein the lengths of said two wavelength conversion devices are varied in order to equalize the outputs of said harmonic wave from said two wavelength conversion devices within a level of 80 to 100%.

11. The laser wavelength conversion device according to claim 10, wherein said two wavelength conversion devices are unified by one of a method selected from optical contact, fusion, adhesion or molding.

12. The laser wavelength conversion device according to claim 9, wherein the energy densities in said two wavelength conversion devices are controlled in order to equalize the outputs of said harmonic wave from said two wavelength conversion devices within a level of 80 to 100%.

13. The laser wavelength conversion device according to claim 12, wherein said two wavelength conversion devices are unified by one of a method selected from optical contact, fusion, adhesion or molding.

14. The laser wavelength conversion device according to claim 9, wherein the distances between said focusing lens and said two wavelength conversion devices are varied in order to control said energy densities.

15. The laser wavelength conversion device according to claim 14, wherein said two wavelength conversion devices are unified by one of a method selected from optical contact, fusion, adhesion or molding.

16. The laser wavelength conversion device according to claim 9, wherein each of said two wavelength conversion devices comprises a unified structure of two wavelength conversion devices which are 180° rotated with each other around said respective angular phase matching direction.

17. The laser wavelength conversion device according to claim 16, wherein said two wavelength conversion devices are unified by one of a method selected from optical contact, fusion, adhesion or molding.

18. The laser wavelength conversion device according to claim 9, wherein said two wavelength conversion devices are unified by one of a method selected from optical contact, fusion, adhesion or molding.

19. A laser wavelength conversion method for generating a fourth harmonic beam from a fundamental beam, which comprises:

making a second harmonic beam elliptical by allowing the fundamental beam to enter into a second harmonic generator through a focusing lens; and allowing said second harmonic beam to enter into a fourth harmonic generator, wherein the orientation which gives the minimum angular tolerance of the phase matching in said fourth harmonic generator is adjusted to the apse axis of said second harmonic beam.

20. The laser wavelength conversion method according to claim 19, wherein said second harmonic generator and said fourth harmonic generator are unified.

21. A laser wavelength conversion device for generating a fourth harmonic beam from a fundamental beam, which comprises:

a focusing lens for focusing said fundamental beam;

a second harmonic generator for making the focused fundamental beam an elliptical second harmonic beam; and a fourth harmonic generator for making said elliptical second harmonic beam a fourth harmonic beam, wherein the orientation of said fourth harmonic generator which gives a minimum angular tolerance of the phase matching is adjusted to the apse axis of said elliptical second harmonic beam.

22. The laser wavelength conversion device according to claim 21, wherein said second harmonic generator and said fourth harmonic generator are unified.

23. The laser wavelength conversion device according to claim 22, wherein said second harmonic generator and said fourth harmonic generator are unified by one of methods selected from optical contact, fusion, adhesion or molding.

* * * * *